(No Model.)
C. WARD.
AUTOMATIC BARREL FILLER.
No. 328,827. Patented Oct. 20, 1885.
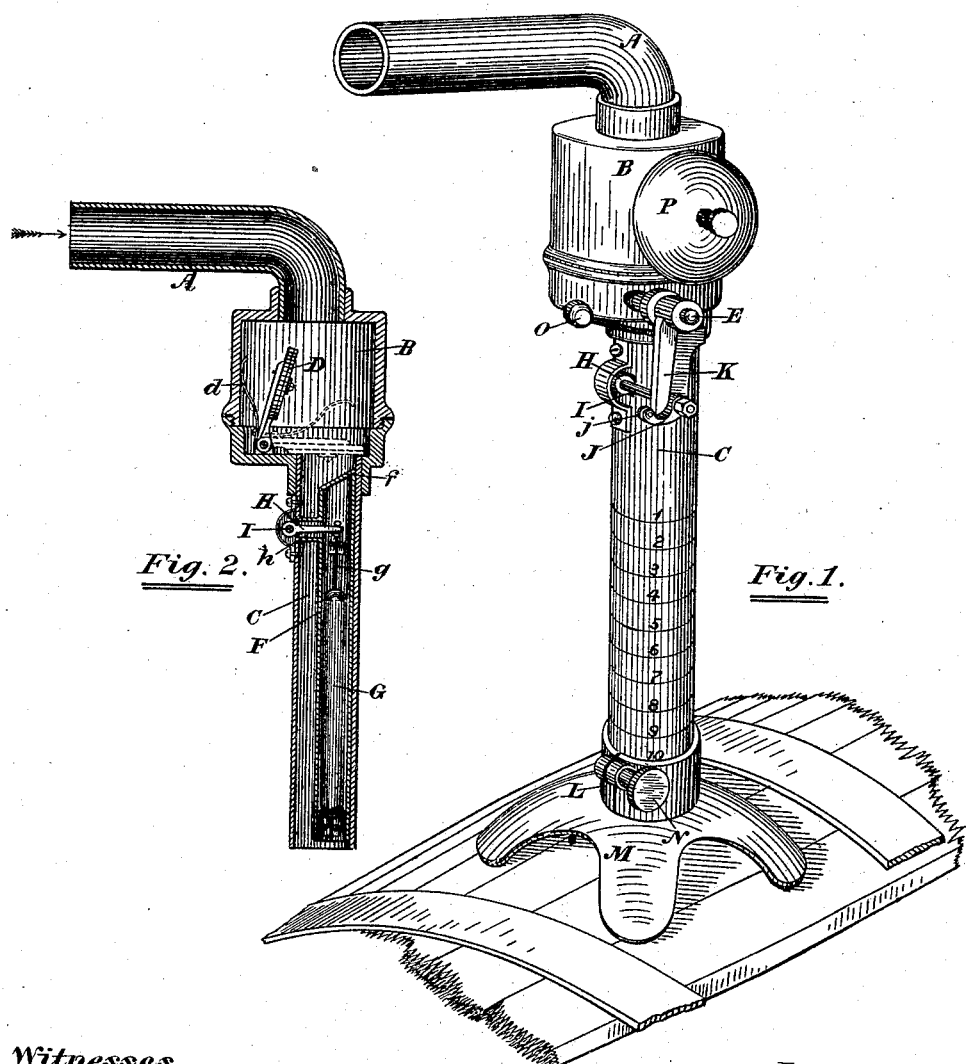
Witnesses.
W. J. Graham.
Chas. C. Baldwin.
Inventor:
C. Ward.
by Donald C. Ridout & Co.
Atty's.

UNITED STATES PATENT OFFICE.

CHARLES WARD, OF TORONTO, ONTARIO, CANADA.

AUTOMATIC BARREL-FILLER.

SPECIFICATION forming part of Letters Patent No. 328,827, dated October 20, 1885.

Application filed June 20, 1885. Serial No. 169,272. (No model.) Patented in England February 28, 1885, No. 2,717, and in Canada July 3, 1885, No. 21,985.

*To all whom it may concern:*

Be it known that I, CHARLES WARD, of the city of Toronto, in the county of York, in the Province of Ontario, Canada, jeweler, have invented an Improved Automatic Barrel-Filler, of which the following is a specification.

The object of the invention is to design a barrel-filler which will be automatically closed by the liquid when it reaches the required height in the vessel being filled, which closing simultaneously causes a gong or other indicator to sound; and it consists, essentially, in providing a float so situated that the liquid within the vessel being filled shall come in contact with the said float and cause it to operate simple mechanism, by which a valve within the filler is instantaneously closed at the moment the liquid has reached the desired height within the barrel or vessel being filled, the spindle on which the valve is pivoted being provided with a hammer arranged to strike a gong at the moment the valve is closed, the whole being arranged substantially as hereinafter more particularly explained.

Figure 1 is a perspective outside view of my automatic barrel-filler. Fig. 2 is a sectional elevation of the same.

A is a pipe designed to connect with a reservoir or tank from which the liquid is to be drawn. This pipe communicates with a valve-chamber, B, from the bottom of which the pipe C leads.

D is a valve, which is connected to the spindle E, journaled in suitable bearings in the chamber B. The valve D is designed to close the mouth of the pipe C when horizontally placed, as indicated by dotted lines in Fig. 2. Within this pipe C a smaller pipe, F, is placed, the upper end of which is closed by the cap *f*, its lower end being open the same as the bottom of the pipe C.

A buoyant float, G, is placed within the pipe F, and is connected by a small rod, *g*, to the arm H, fastened to the spindle I, suitably journaled on the exterior of the pipe C.

A pipe, *h*, connects the pipes F and C, so as to permit the arm H to pass through it from the exterior of the pipe C to the interior of the pipe F, without leaving any aperture through which the fluid passing through the pipe C might enter into the pipe F.

An arm, J, is fastened to the spindle I, and has a small friction-roller, *j*, on its end, as indicated.

K is an arm connected to the spindle E, and so situated that when the valve D is open, as indicated in Fig. 2, and the pipe F is empty, it will be held behind the roller *j* on the arm J, as indicated in Fig. 1.

L is a split sleeve attached to a stand, M, designed to rest upon a barrel, and provided with a pinch-screw, N, designed to clamp together the split sides of the sleeve L, for the purpose of grasping the pipe C, as indicated in Fig. 1, in which figure it will be noticed that the said pipe C is marked with a series of circles indicated by number. These circles are for the purpose of indicating when the pipe C has been inserted into the barrel sufficiently far to insure that the particular liquid with which the barrel is being filled shall act on the float G at the proper moment to close, as hereinafter specified, the valve D when the liquid has reached the proper height within the valve, it being of course understood that liquids of different specific gravities require more or less displacement in order to support the float G and cause it to operate the mechanism with which it is connected.

From the foregoing description it will be understood that when the valve D is open, as indicated in Fig. 2, the liquid coming through the pipe A will pass through the pipe C into the barrel or vessel to be filled. As soon as the level within the said barrel or vessel reaches the float G, it will, when sufficient displacement has taken place, cause the said float G to rise within its pipe F, and as the said float G is connected, as specified, to the arm H, attached to the spindle I, the said spindle will be rocked in its journal the moment that the float rises, and as the arm J is attached to the spindle I the said arm will be moved away from the arm K as the float G rises, as specified. Consequently, so soon as the arm J is clear of the arm K, the valve D, having nothing else to support it, will close instantly, and the supply of liquid will be instantaneously cut off from the pipe C.

With the view of facilitating the closing of the valve, I provide a spring, *d*, attached to the back of the said valve.

The small friction-roller $j$ is of great importance for the satisfactory operation of the mechanism described, as the moment the arm J commences to move down, the said roller $j$ will revolve, consequently avoiding the friction which might be produced by the pressure of the arm K.

O is a hammer attached to the spindle I, and P is a bell or gong which is struck by the hammer O the moment that the valve D closes. Consequently the attendant is instantly advised immediately that the particular barrel or vessel has been filled.

The graduated tube C performs important functions in relation to the float and valve, as has been mentioned, and the split sleeve L serves important relations with the said tube, allowing tubes of different sizes to be clamped with a large and firm bearing and without marring.

I am aware of the Patents Nos. 113,954 and 208,332, and make no claim to the construction shown therein as forming part of my invention.

I am also aware that alarm-faucets are not new, and therefore do not claim such, broadly.

What I claim as my invention is—

1. In a barrel-filler, the combination, with the graduated tube C, chamber B, and smaller pipe, F, arranged within said pipe C, of a float, G, within the pipe F, and connected to a lever attached to the spindle I, and the valve D, carried by the spindle E, provided with an arm adapted to engage an arm on the spindle I, all arranged and operating substantially as and for the purpose specified.

2. In a barrel-filling device, the combination of a float, a lever connecting said float with the spindle I, the valve D, carried by the spindle E, arm K, carried by said spindle and engaging with an arm in the spindle I, the bell P, and the hammer O, attached to the spindle I and arranged to strike said bell as the valve D closes, substantially as and for the purposes specified.

Toronto, June 10, 1885.

CHAS. WARD.

In presence of—
    CHARLES C. BALDWIN,
    D. MITCHELL MCDONALD.